May 7, 1935.  W. G. WILSON  2,000,056
METHOD AND APPARATUS FOR COMPRESSING AND INDENTING
Filed Feb. 8, 1933  6 Sheets-Sheet 1

INVENTOR:
Wylie G. Wilson
BY
Ramsey & Kent
ATTORNEYS

May 7, 1935.     W. G. WILSON     2,000,056
METHOD AND APPARATUS FOR COMPRESSING AND INDENTING
Filed Feb. 8, 1933     6 Sheets-Sheet 2
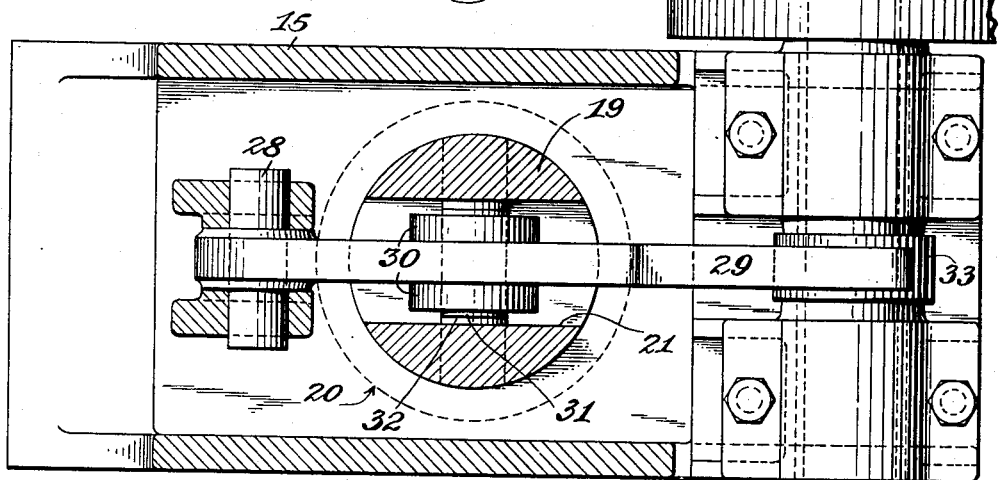
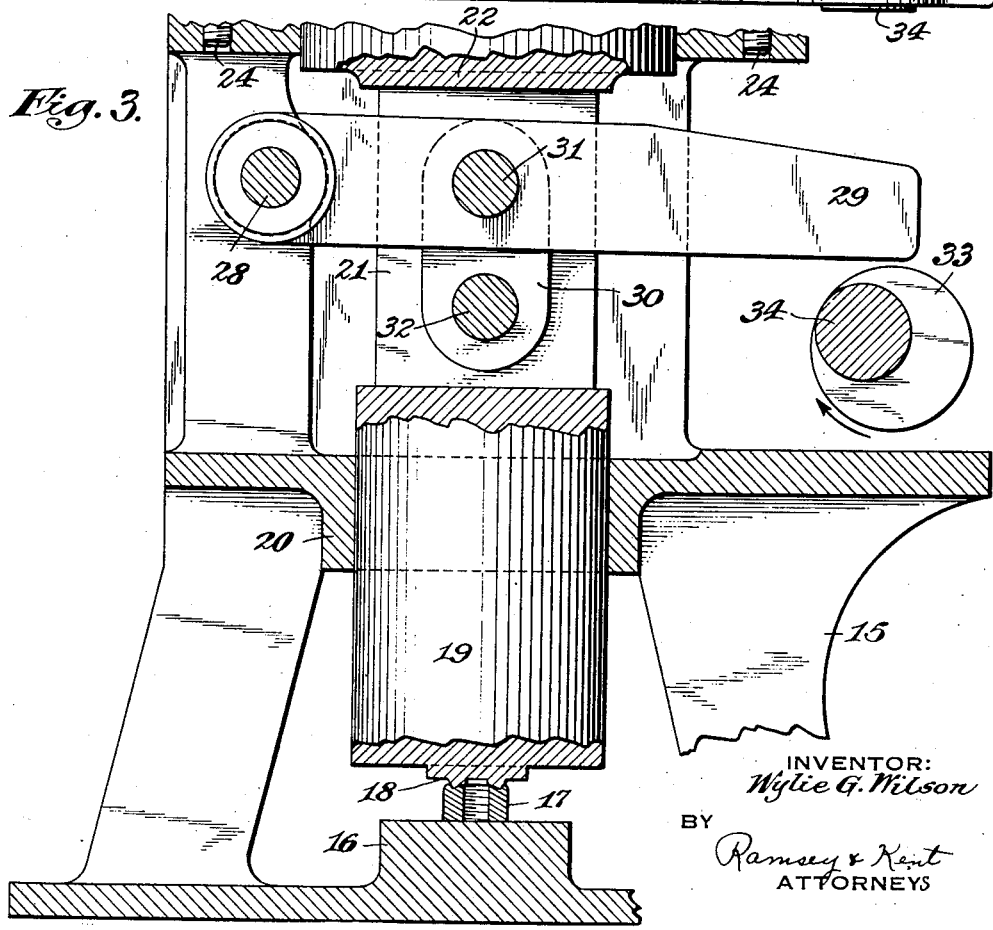
INVENTOR:
Wylie G. Wilson
BY
Ramsey & Kent
ATTORNEYS

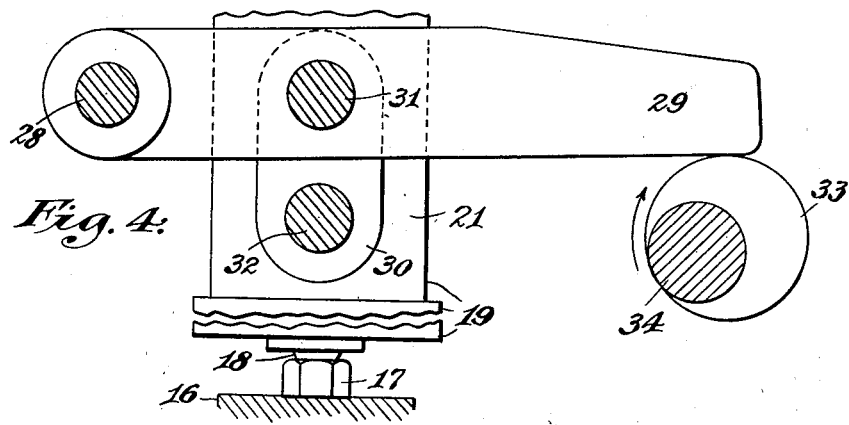
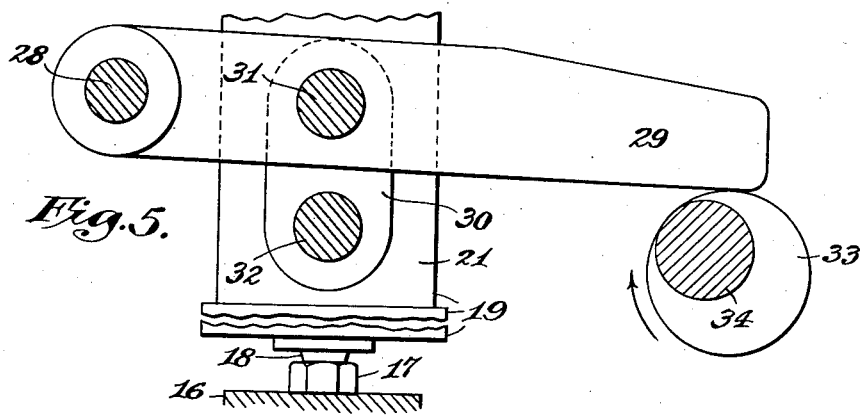
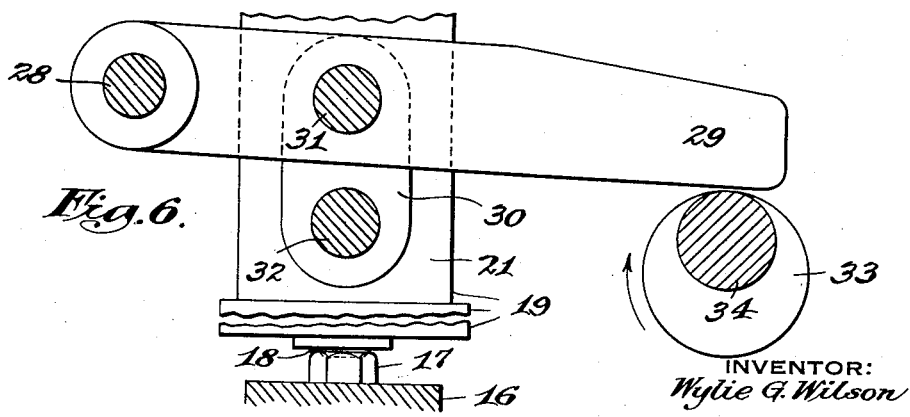

May 7, 1935.  W. G. WILSON  2,000,056
METHOD AND APPARATUS FOR COMPRESSING AND INDENTING
Filed Feb. 8, 1933   6 Sheets-Sheet 4
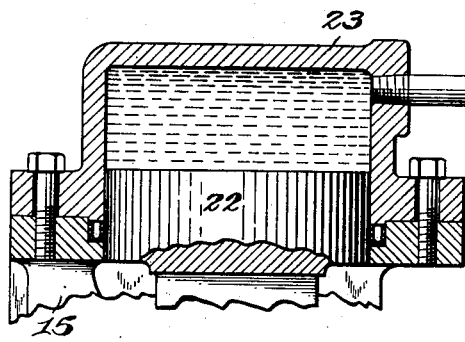
Fig. 7.
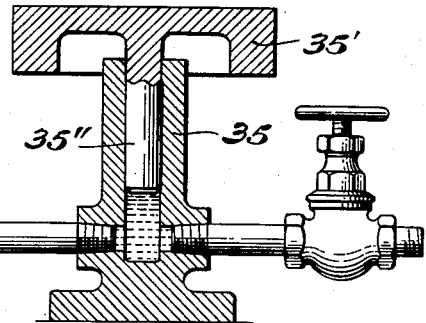
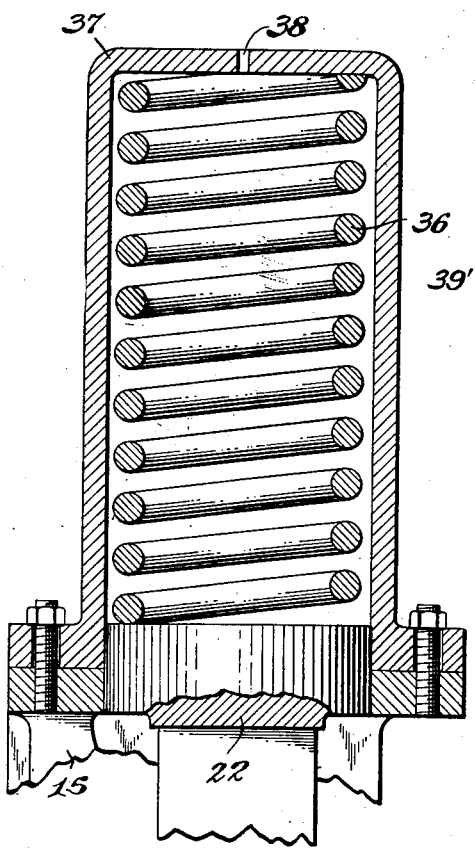
Fig. 8.
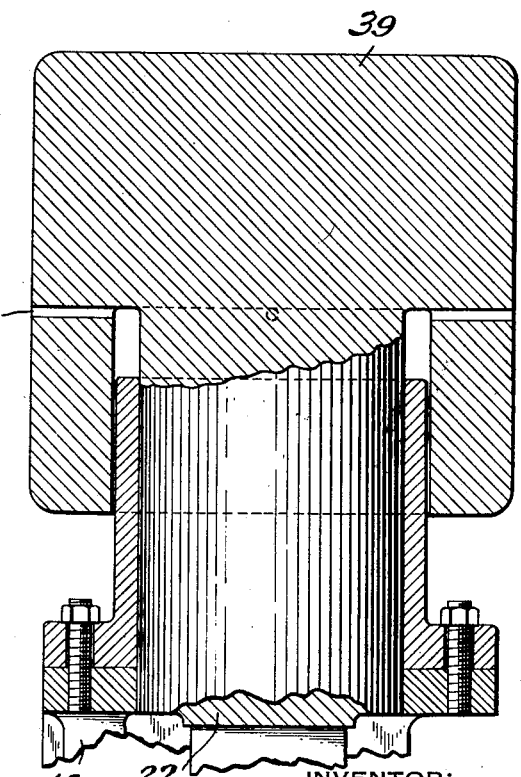
Fig. 9.
INVENTOR:
Wylie G. Wilson
BY
Ramsey & Kent
ATTORNEYS

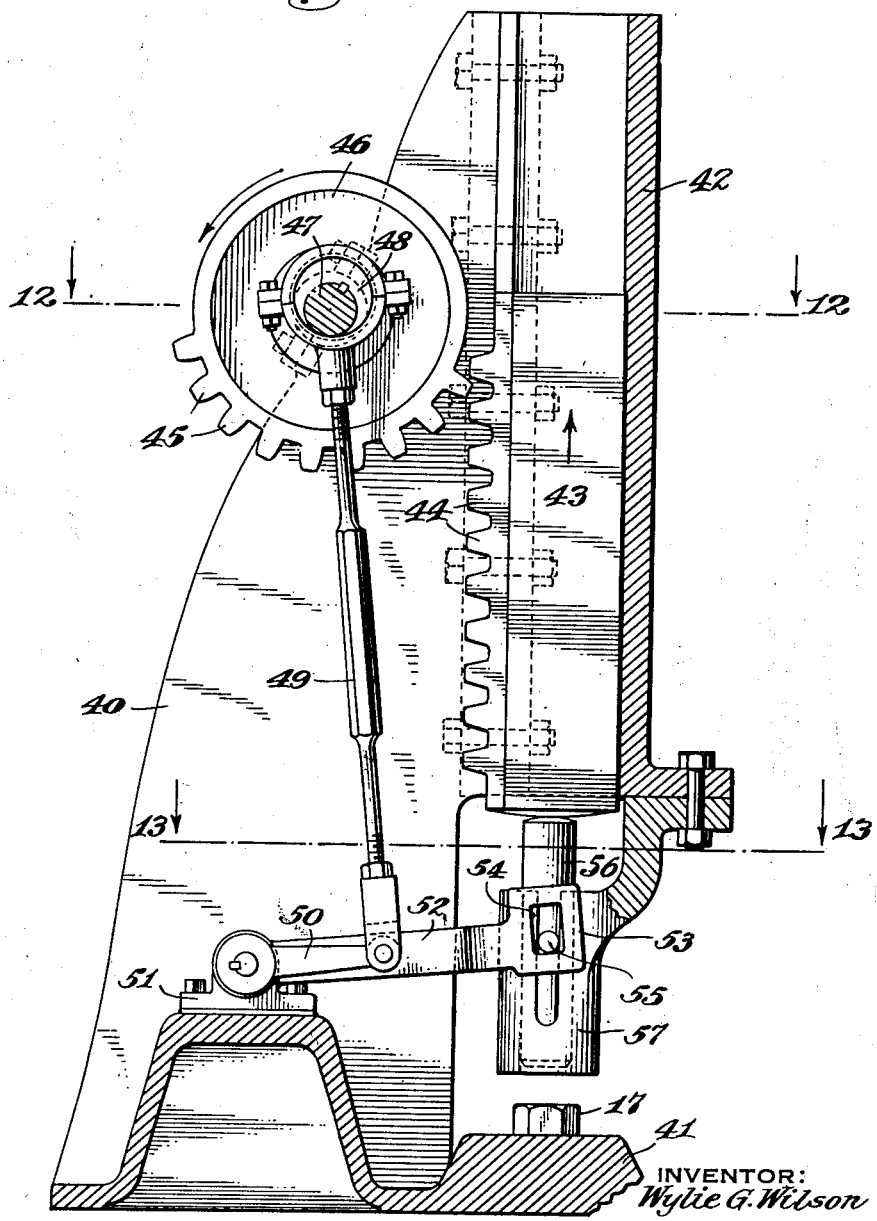

May 7, 1935.  W. G. WILSON  2,000,056
METHOD AND APPARATUS FOR COMPRESSING AND INDENTING
Filed Feb. 8, 1933  6 Sheets-Sheet 6
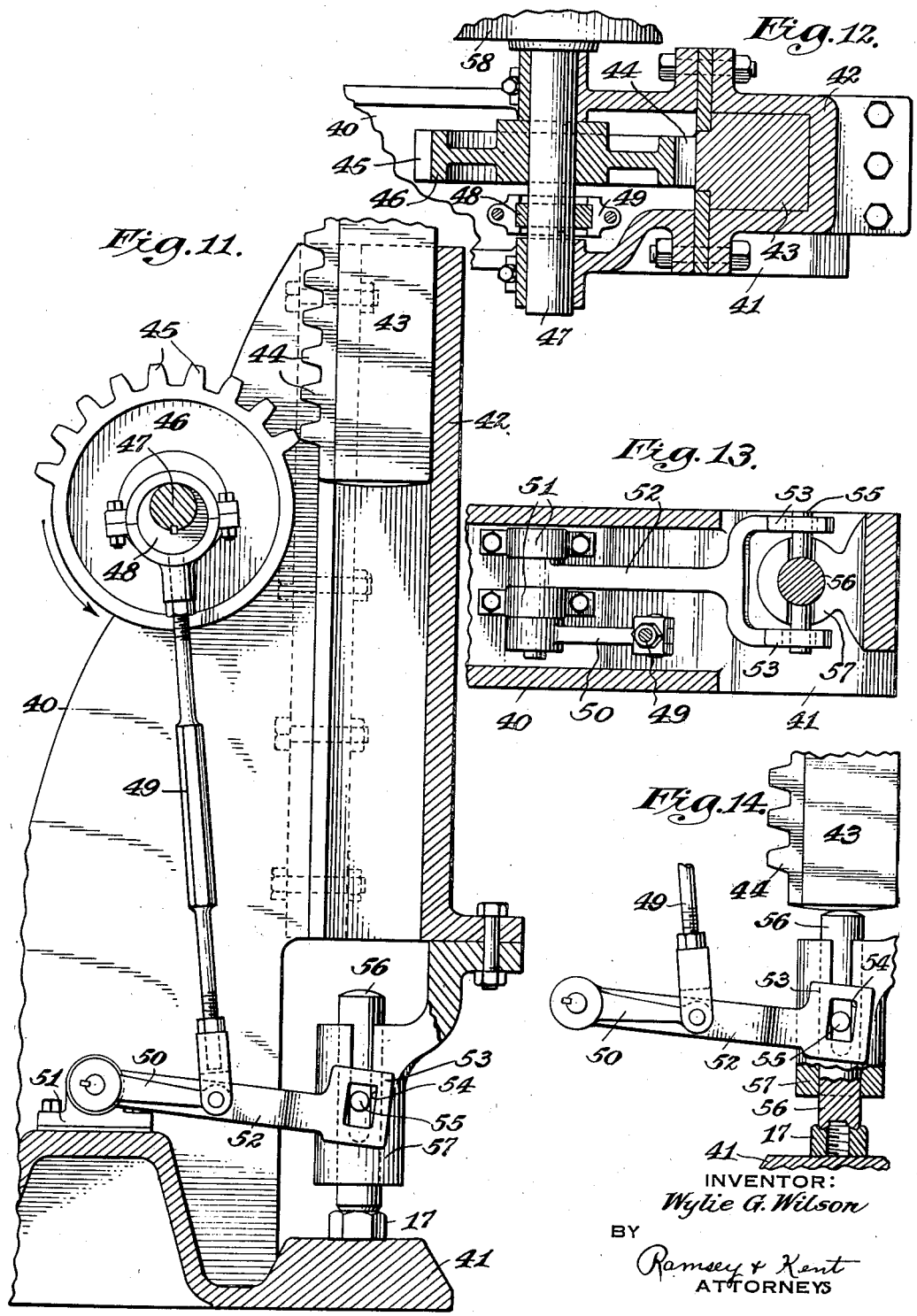
INVENTOR:
Wylie G. Wilson
BY
Ramsey & Kent
ATTORNEYS Patented May 7, 1935

2,000,056

UNITED STATES PATENT OFFICE 2,000,056

METHOD AND APPARATUS FOR COMPRESSING AND INDENTING

Wylie G. Wilson, Elizabeth, N. J., assignor to Wilson Locknut Company, Jersey City, N. J., a corporation of Delaware Application February 8, 1933, Serial No. 655,750

14 Claims. (Cl. 10—72)

This invention relates to a process for subjecting a succession of objects which nominally are of equal height, but which actually vary somewhat in height, to predetermined pressure from an axially moving tool, which pressure is the same for each successive object regardless of height variations of these objects. And the invention also relates to apparatus for the practice of such a process.

Specifically, and also as illustrative of the principles involved in my invention, the conception relates to the treatment of a succession of ordinary threaded nuts, the effect of the pressure being to indent a cross axial face of the nut to a predetermined extent and/or area, and thereby accomplish a deformation of the nut thread sufficient to convert the nut into a locknut.

Speaking particularly of nuts, though what I have to say in this connection has a bearing also on other objects which it is desired to compress or indent, it is a fact that taking a batch of cold pressed nuts of high quality manufactured by a very reputable manufacturer, and which nuts are supposedly all of the same axial thickness, a variation of as much as .01" is found in the nuts of the ½" size. The nuts produced by several makers vary as much as $\frac{1}{16}$", and ½" nuts of the same maker vary as much as $\frac{1}{32}$".

Assume that for the purpose of converting an ordinary nut into a lock-nut by indenting one of the axial faces thereof, I have found that for ½" nuts it is desirable to accomplish an indentation of practically .03125" or $\frac{1}{32}$". If we attempt to indent such nuts on a press such as is purchaseable today with the customary arrangement of a fixed travel, so that the distance between the end of the indenting tool and the anvil remains constant at the end of the indenting stroke regardless of variations in height of the pieces to be successively indented, the depth of indentation may therefore vary 33% to 100% even using nuts from the same maker, or 200% using different makers' nuts, the desired indentation being say $\frac{1}{32}$". It is, of course, wholly out of the question to measure the nut which is to be indented, and then adjust the height of the anvil so that the indentation will be correct, because to do so would mean spending far more time making adjustments (and making adjustments of such fine character that a highly skilled and most careful mechanic would be needed to make), than is permissible in a commercial sense.

Accordingly I conceived of the invention herein described with reference to the accompanying drawings, in which:

Fig. 2 is a section taken on the line 2—2 of Fig. 1;

Fig. 3 is a view similar to Fig. 1, with parts broken away, and showing the press with the parts in position on the completion of the nut indenting operation;

Fig. 4 is a more or less diagrammatic view showing the relation of certain operative parts when the indenting tool proper is in contact with a relatively axially high nut;

Fig. 5 is a similar view showing the indenting tool in contact with a relatively low nut;

Fig. 6 is a similar view showing the relation of parts when indentation has been completed on a low nut;

Fig. 7 is a view partly in section and partly in elevation showing hydraulic means for exerting uniform pressure on the indenting tool;

Fig. 8 is a sectional view showing a spring means for exerting uniform or substantially uniform pressure on the indenting tool;

Fig. 9 is a sectional view showing weight means for exerting substantially uniform pressure on the indenting tool;

Fig. 10 is a sectional view illustrating another form of machine for accomplishing the objects of my invention showing the indenting tool proper out of contact with a nut;

Fig. 11 is a similar view showing the relation of parts when the indenting tool proper is in contact with the nut, but before the weight has been released for its descent upon the tool;

Fig. 12 is a sectional view showing details of the operating mechanism for the machines shown in Figs. 10 and 11;

Fig. 13 is a sectional view showing details of other operating connections; and

Fig. 14 is a detail view showing positions of the parts when the tool has been driven down into a high nut.

Figure 1:
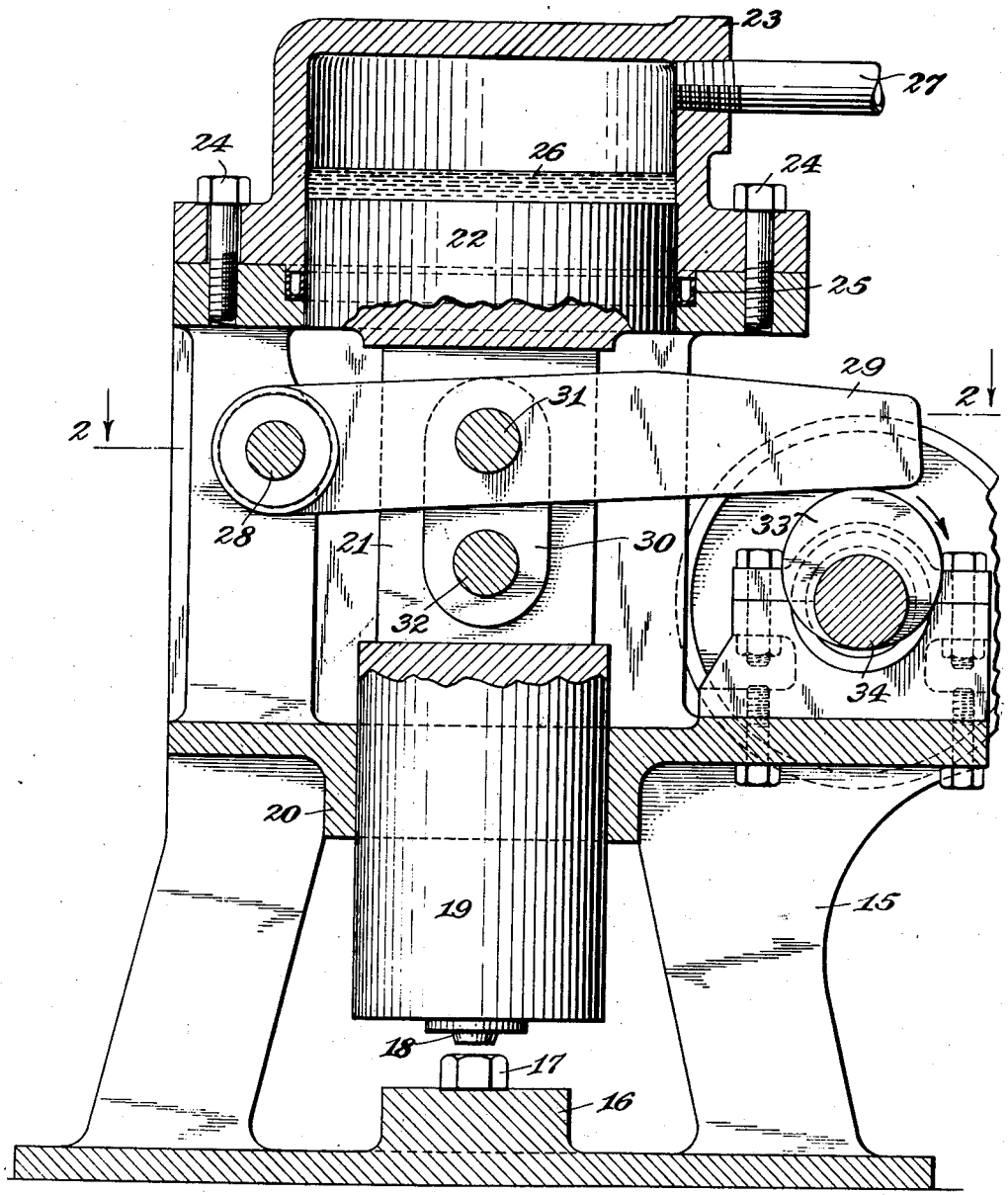
Fig. 1 is a view partly in section and partly in elevation of a hydro-mechanical press designed for the treatment of nuts as above suggested, and showing the machine ready for operation on what may be called a low nut, that is, to say, one which has a smaller axial dimension than it is nominally supposed to have.

Referring to the numerals on the drawings, I show at 15 a machine frame, the base of which carries an anvil 16 on which may be supported in proper position and resting on one of its end faces, a nut 17. It will be understood, of course, that means are provided for feeding to and removing from operating position on the anvil 16 a succession of nuts, the feeding and removing means being synchronized with the movements of other parts of the machine; and of course it is contemplated that each nut will occupy a definite position on the anvil in properly centered relation to the indenting tool which travels to and into and then away from it.

The indenting tool, which may have the form in cross section exhibited for example in Fig. 3, is identified by the reference character 18, and is located at the lower end of a plunger or piston 19 that travels in a right line (vertically in the drawings), within guides 20 formed in the frame of the machine. Intermediate its ends the plunger 19 is provided with an opening 21 that extends from side to side thereof, and above this opening 21 the piston is cross axially enlarged, the enlargement being indicated by the reference character 22. The enlargement 22 of the piston is guided in guides formed partly in the upper end of the machine frame and partly in a hollow cylindrical chamber member 23 which covers the upper end of the machine and is bolted thereto as by means of the bolts 24. Between the member 23 and the top of the machine frame I may interpose a hydraulic leather or gasket 25. The parts are so proportioned that there is at all times a considerable space or chamber within the member 23 above the piston enlargement 22, and this chamber may be partly filled with oil or the like indicated at 26. Pressure, for example pressure of compressed air, is introduced into this chamber by way of pipe 27.

Pivoted as at 28 in the machine frame is a lever 29 which extends through the opening 21 of the piston and which is connected to the piston by means of two parallel links 30, each link being pivotally connected, as at 31, to the lever 29, and also pivotally connected, as at 32, to the piston.

The free end of the lever 29 extends over and rests upon an eccentric 33 carried by a shaft 34 suitably mounted and driven in the machine frame. Various rotative positions of the shaft 34, and consequently of the eccentric 33, are shown in Figs. 1, 3, 4, 5 and 6. In Fig. 1, for example, with the eccentric in the position there shown, the lever 29 is raised, bringing the piston 19 to its up position, against the force of whatever pressure there may be in the chamber 23, which pressure, it is to be understood, is hydraulic or other fluid pressure, maintained constant. It is when the piston is in the up position of Fig. 1 that a nut 17 may be brought to its Fig. 1 position or removed therefrom. If a so-called low nut is brought into position to be operated on, as in Fig. 1, the timed rotation of shaft 34 will presently bring the eccentric 33 to the position indicated in Fig. 5, that is to say the position where the indenting tool 18 is in contact with the top face of the nut. As the shaft 34 continues its rotation the eccentric takes the Fig. 6 position, permitting the free end of lever 29 to descend and therefore permitting the fluid pressure in the chamber 23 to drive the piston 19 downwardly so that indentation of the nut takes place, the extent of downward movement under the fluid pressure, depending normally upon the resistance offered by the nut, and being limited in any case by the mechanical arrangement. On further rotation of the shaft 34 the eccentric brings about the lifting of the end of the lever 29, drawing the piston upwardly and its indenting tool out of contact with the nut, so that the nut may be removed and replaced by the next nut to be treated.

If a high nut happens to come along in the line of succession, the operation is substantially the same, except that the initial contact between the indenting tool and the face of the nut takes place sooner than was the case with the low nut. The indenting pressure is the same in both cases, corresponding to the fluid pressure maintained in the chamber 23.

Instead of employing the predetermined and constantly maintained pressure of compressed air for example, I may utilize a non-compressible fluid under pressure. In Fig. 7 I show a pressure chamber 23 which is kept full of some suitable liquid, as, for example, oil, which is fed into the chamber and whose pressure is kept constant by means of the familiar stabilizer 35. The weight 35' of the stabilizer is so calculated in relation to the area of piston 35'' that if, for example, fluid at one thousand pounds per square inch is being used, the fluid pressure, multiplied by the area of the piston, just balances the weight.

In Fig. 8 the pressure on the piston 22 is due to a coil spring 36, which in the upward movement of the piston is compressed between the latter and the upper end of a housing 37, a vent 38 being provided for obvious reasons. It is necessary that the spring be of such length that the variations in height of the nuts do not practically, that is to an extent of more than say about 5% or less, change the compression or the pressure upon the nut.

In Fig. 9 there is no closed chamber 23, but the piston extends upwardly beyond the same and has attached to it or formed with it a weight 39 which acts in the same way as the spring 36 of Fig. 8 or the air pressure or fluid pressure of the other embodiments already described. The weight 39 may be provided with vent passages 39' to prevent dash-pot effect. And the weight will be such that slight differences in the height of the successive nuts will not practically change the pressure applied to any of them.

It is to be understood that the devices of Figs. 7, 8 and 9 are to be employed in connection with the positively acting mechanical elements already described with reference to Figs. 1 to 6 inclusive.

In the Fig. 1 form of the device the pipe 27 as already described leads to an air receiver which is kept at constant pressure. Since the circuit is closed, the effect of temperature changes can be avoided by keeping the receiver at constant temperature. The only pressure changes then would be due to the displacement of the piston, and leakage. By making the capacity of the receiver plus cylinder say 100 times as great as the displacement caused by one movement in one direction of the piston, the pressure difference thus caused will be 1%. 1% difference in pressure on the nut will not practically affect the result. Or, referring to Fig. 7, the stabilizer will compensate for piston displacement, temperature changes, and leakage. In either case leakage may be compensated for by occasionally pumping up the pressure, either automatically or by means of a detachable pump. Using the 100 times displacement capacity receiver, pressure can be held steady (instead of keeping receiver at temperature) by the use of an automatically controlled air pump which keeps the pressure up to say 100 lbs., plus a relief valve which permits egress of air if—on account of temperature rise or other cause—the pressure rises above 100 lbs. As these automatic pump controls and relief valve are well-known commercial articles, it is not deemed necessary to show or describe them. The air receiver is simply a closed tank.

Referring to Fig. 10 of the drawings, there is a machine frame 40 provided with anvil 41 for the nuts. A vertically upstanding portion 42 of the frame provides a guide for a vertically traveling weight 43, the outer edge of which is provided with a rack 44, for engagement with the gear teeth 45 of a mutilated gear 46 rotatable on a shaft 47. Shaft 47 also carries an eccentric 48 and from this eccentric extends an eccentric rod 49, which rod incidentally may provide a self-contained turn-buckle for adjustment as to length. The lower end of this rod 49 is pivotally connected with one arm 50 of the bell crank lever pivoted in bearings 51, the other end of the bell crank, 52, providing a yoke 53, each leg of the yoke being provided with a closed-ended slot 54. In these slots are received pins or trunnions 55 which extend laterally from a cylindrical tool 56 that slides vertically in a guideway 57 depending from the weight guide 42, the legs of the yoke 53 embracing the fixed guide 57 as shown clearly in Figs. 11 and 13.

The parts are so synchronized and proportioned that upon continued rotation of shaft 47 (as by means of a pulley 58), the following movements take place: Beginning with the positions shown in Fig. 10, the bell crank has been rocked on its pivot resulting in engagement of the pins 55 with the lower closed ends of the slots 54, with resulting upward movement of the sliding tool 56, the upper end of which by its engagement with the lower end of the weight 43 has moved the weight to the Fig. 10 position. Continued rotation of the shaft 47 results in engagement between the teeth 45 and the rack 44, bringing the weight 44 substantially to the Fig. 11 position. As the mutilated gear 46 continues to rotate its teeth 45 leave the rack 44, whereupon the weight drops upon the upper end of tool 56, the tool 56 having meanwhile, because it is slidable in its bearings, moved down into contact with the nut which is below it, with the end result that the nut is indented as shown in Fig. 14. The weight 43 is, of course, free to drop because its rack is opposed to a smooth untoothed face of the gear. I prefer to use the separate tool 56 between the weight and the nut because in this way any edges on the tool are not subjected to nearly so much shock as if such edges were directly attached to the weight, particularly as with my arrangement the indenting edges are in contact with the nut when the blow is struck. It is obvious that because the upward movement of the tool 56 also raises the weight, and because the position of the eccentric can be exactly predetermined for a given position of the first contacting tooth on the gear 46, and as the eccentric also governs the height of the weight at that time, an exact predetermination of relative position of tooth on weight and tooth on gear can be always obtained, that is, they will always mesh perfectly regardless of the final drop position of the falling weight. Of course the weight of the member 43 and the distance through which it travels in striking the tool 46 will be predetermined for a particular work in hand, and I prefer that the distance traveled by the weight shall be at least 25 times (preferably 100 times or more) the range of variations in height of the nuts for the treatment of which the apparatus has been adjusted.

I claim:

1. The process which consists in providing a plurality of nuts which have an ascertained maximum variation in axial height, feeding one of the nuts to a predetermined point below an axially-movable indenting tool whose axis is alined with that of the nut, lowering the tool into contact with the upper face of the nut, and then permitting a falling weight of predetermined mass to drop through a predetermined distance upon the indenting tool, the tool being held at all times to true axial movement, raising the tool and the weight, removing the treated nut, inserting another nut, and repeating the operations above set forth, the drop of the weight being at least 25 times the variation in axial height of the plurality of nuts placed in succession beneath the indenting tool.

2. Apparatus of the character described comprising a support for nuts of varying axial thickness, an indenting tool movable into position to indent an end face of a nut resting on said support, and means for applying a substantially uniform pressure to said tool to cause the tool to penetrate each nut to a predetermined substantially uniform depth, said tool being brought to rest solely by the resistance of the nut to penetration.

3. Apparatus of the character described comprising a support for nuts of varying axial thickness, an indenting tool maintained under substantially uniform pressure forcing the tool toward said support, and means for intermittently moving said tool away from said support while it is under said pressure.

4. Apparatus of the character described comprising a support for nuts of varying axial thickness, an indenting tool maintained under substantially uniform pressure forcing said tool toward said support, and means for intermittently moving said tool away from said support while it is under said pressure and for releasing said tool to approach said support.

5. Apparatus of the character described comprising a support for nuts of varying axial thickness, an indenting tool movable into position to indent an end face of a nut resting on said support, a piston secured to said tool, means for applying and maintaining substantially uniform pressure on said piston forcing the tool toward the support, cam controlled mechanism for intermittently raising said piston and the tool while under said pressure and for releasing said piston and said tool to approach said support.

6. Apparatus of the character described comprising a support for nuts of varying thickness, an indenting tool movable into position to indent an end face of a nut, resting on said support, a piston secured to said tool, a weight for applying and maintaining substantially uniform pressure on said piston, and means for intermittently raising and releasing said piston and tool.

7. Apparatus of the character described comprising a support for nuts of varying thickness, an indenting tool movable into position to indent an end face of a nut resting on said support, a piston secured to said tool, a weight for applying and maintaining substantially uniform pressure on said piston, and cam controlled mechanism for intermittently raising said piston and for releasing the piston to cause the tool to approach the support.

8. Apparatus of the character described comprising a support for nuts of varying thickness, an indenting tool guided for movement toward and away from said support, a crank connected to said tool for intermittently raising the tool and intermittently lowering it against a nut on the support, the connection between the crank and the tool being such that the tool is capable of limited movement independently of the crank, and means for applying pressure to the tool while resting against a nut.

9. Apparatus of the character described comprising a support for nuts of varying thickness, an indenting tool guided for movement toward and away from said support, a crank for raising and lowering the tool, a hammer, and means for releasing the hammer to apply pressure to the tool when the tool is in lowered position.

10. Apparatus of the character described comprising a support for nuts of varying thickness, an indenting tool guided for movement toward and away from said support, a slidable hammer, means for raising said hammer to a predetermined height and for releasing it to permit it to slide into contact with said tool due to gravity, said tool and hammer being brought to rest solely by the resistance of the nut to penetration.

11. Apparatus of the character described comprising a support for nuts of varying thickness, an indenting tool guided for movement toward and away from said support, a crank for raising and lowering said tool, a slidable hammer having a rack bar thereon, a mutilated gear intermittently engaging said rack to raise the hammer and to release it when raised, said hammer when released being slidable into contact with said tool.

12. Apparatus of the character described comprising a support for nuts of varying thickness, an indenting tool guided for movement toward and away from said support, a crank connected to said tool by a lost motion connection for raising and lowering said tool, a slidable hammer, means for raising said hammer to a predetermined height and for releasing it to fall into contact with said tool, said lost motion connection permitting the tool to rest against successive nuts of varying axial thickness.

13. Apparatus of the character described comprising a support for nuts of varying axial thickness, an indenting tool movable into position to indent an end face of a nut resting on said support, and means for applying a substantially uniform pressure to said tool to cause the tool to penetrate each nut until a predetermined resistance is offered by the nut to further penetration.

14. Apparatus of the character described comprising a support for nuts of varying thickness, an indenting tool guided for movement towards and away from the support, a hammer, a crank for raising and lowering the tool and for raising the hammer to a predetermined distance above the support, and means for raising the hammer to a further distance above the support and for releasing the hammer to apply pressure to the tool when the tool is in lowered position.

WYLIE G. WILSON.